United States Patent [19]

Söderholm

[11] Patent Number: 4,600,877
[45] Date of Patent: Jul. 15, 1986

[54] ARRANGEMENT IN TRANSFORMERS

[75] Inventor: Rolf Söderholm, Gothenburg, Sweden

[73] Assignee: Kraftelektronik AB, Surte, Sweden

[21] Appl. No.: 651,943

[22] Filed: Sep. 19, 1984

[30] Foreign Application Priority Data

Sep. 22, 1983 [SE] Sweden .................................. 8305137

[51] Int. Cl.⁴ .............................................. H02J 3/00
[52] U.S. Cl. ..................................... 323/324; 323/356
[58] Field of Search ............... 323/237, 239, 241, 246, 323/320, 322, 324, 327, 356

[56] References Cited

U.S. PATENT DOCUMENTS 4,016,482  4/1977  Cielo et al. ........................... 323/289
4,441,146  4/1984  Vinciarelli ............................. 363/56

Primary Examiner—Patrick R. Salce
Assistant Examiner—Anita M. Ault
Attorney, Agent, or Firm—Fleit, Jacobson, Cohn & Price

[57] ABSTRACT

In a transformer having a primary winding which is connectable to an a.c. voltage source via switch means which opens and closes at a controllable frequency, there is connected in parallel with the primary or secondary winding of the transformer a circuit which for at least a part of the time during which the switch means opens maintains magnetization of the transformer in a direction opposite to the direction of the magnetization caused by the subsequent closing of the switch means.

5 Claims, 7 Drawing Figures

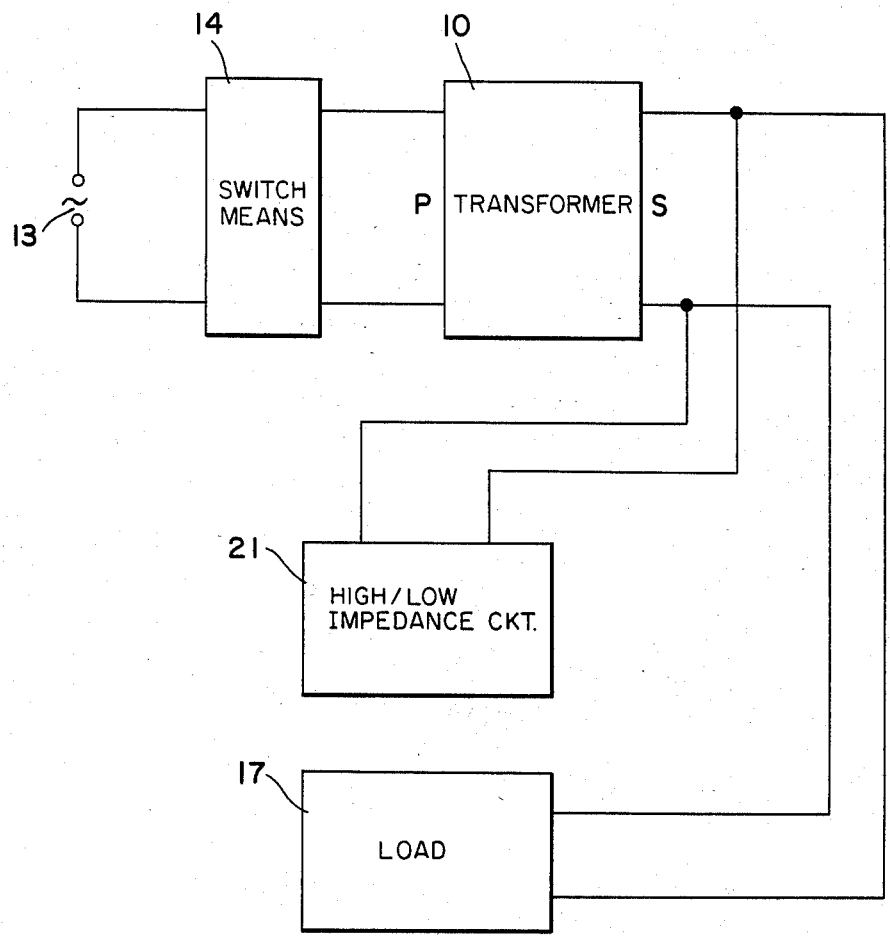

ARRANGEMENT IN TRANSFORMERS

The present invention relates to a transformer having a primary winding which is connectable to an a.c. voltage source via a switch means which opens and closes at a controllable frequency.

In such operation of normally dimensioned transformer where certain of the periods of the a.c. voltage source are omitted, for example such that said switch means is closed during lesser or greater parts of only each third or each fifth half-period, the transformer may become saturated and uncontrollable currents may occur on the primary side of the transformer, resulting, inter alia, in electric losses. This particularly applies when the load includes capacitive components. This disadvantage can be overcome, by using a powerfully overdimensioned transformer, although this greatly increases costs and transformer weight.

The object of the present invention is to provide a novel and advantageous arrangement with which the aforediscussed disadvantages are substantially removed.

To this end it is proposed in accordance with the invention that in a transformer of the aforesaid kind, there is connected in parallel with the primary or secondary winding a circuit which, for at least part of the time during which the switch means is open, maintains magnetization of the transformer in a direction opposite the direction of the magnetization caused by the subsequent closing of the switch means.

The arrangement according to the invention effectively avoids the occurrence of uncontrolled currents on the primary side of the transformer, rendering it unnecessary to overdimension the transformer while incurring but slight increases in price and in the weight of the transformer.

The invention will now be described in more detail with reference to the accompanying drawing, further characteristic features and advantages of the invention being made apparent in conjunction therewith.

FIG. 7 illustrates the circuit arrangement coupled in parallel with the secondary winding.

Figure 1:
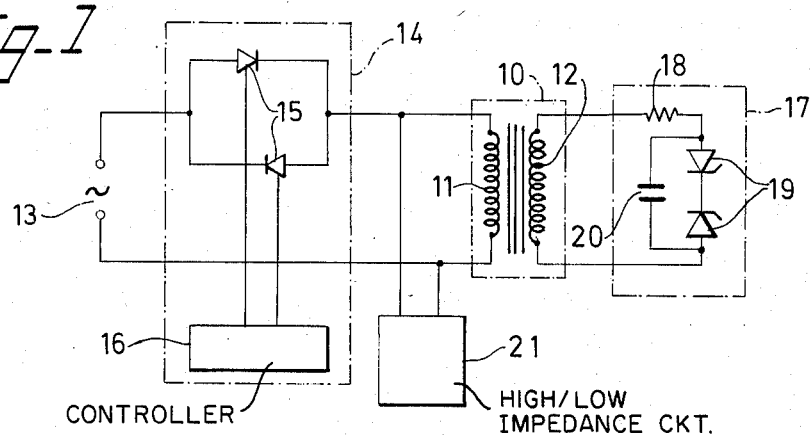
FIG. 1 is a circuit diagram of an arrangement according to the invention.

In FIG. 1 the reference 10 generally identifies a transformer which includes a primary winding 11 and a secondary winding 12. The primary winding 11 is connected to an a.c. voltage source 13 via a switch means, generally shown at 14, which can open and close the connection between the voltage source 13 and the primary winding 11 at a controllable frequency, in a known manner. In the illustrated embodiment, the switch means 14 comprises a thyristor regulator, comprising two anti-parallel connected thyristors 15 and a control device 16, with which desired interval between ignition of the two thyristors 15 and desired ignition angle can be set.

The secondary winding 12 is connected to a load 17, represented in the illustrated embodiment by a resistance 18, two zener diodes 19 connected in series-opposition and a capacitance 20 connected in parallel with the zener diodes 19.

In order to prevent the transformer 10 from becoming saturated, and to avoid the occurrence of current surges through the primary side of the transformer as a result of such saturation, when the control device 16 is adjusted in a manner such that given half periods of the voltage source 13 are omitted, there is connected in parallel with the primary winding 11 a circuit 21 which exhibits a high impedance to voltages above a given value, and a low impedance to voltages below said given value, said given value substantially lying beneath the output voltage (top voltage) of the a.c. voltage source 13, for example within the range of 2–30%, preferably 3–15%, of the output voltage of the a.c. voltage source 13.

Figure 2:
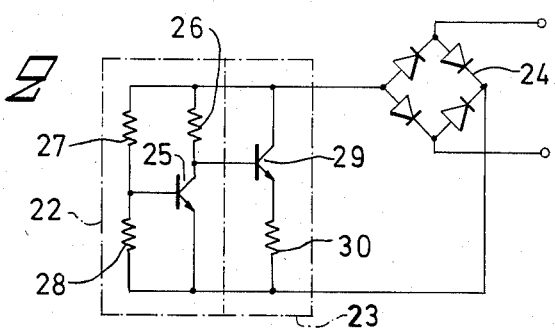
FIG. 2 is a diagram of a circuit used in the arrangement illustrated in FIG. 1.

A principle design of the circuit 21, chosen by way of example, is illustrated in FIG. 2, according to which said circuit 21 includes a control circuit-part 22, a main circuit-part 23, and a rectifying bridge 24. The control circuit-part 22 incorporates a transistor 25 in series with a large resistance 26, e.g. in the order of 45 kΩ, connected to the collector of said transistor. Connected in parallel with the transistor 25 and the resistance 26 are two resistances 27, 28 of which the first resistance 27 is much greater than any of the resistances 26 and 28, for example about ten times greater than the resistance 26, and of which the other resistance 28 constitutes, for example, about one third of the resistance 26. The base of the transistor 25 is connected to a point between the resistances 27, 28.

The main circuit-part 23 includes a transistor 29 in series with a resistance 30 connected to the emitter thereof.

Figure 3:
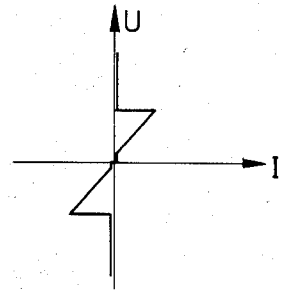
FIG. 3 is a diagram illustrating the voltage/current characteristic of the circuit illustrated in FIG. 2.

The resistances 26, 27, 28 and the transistors 25, 29 are so adapted to one another that current will flow through the transistor 29 and resistance 30 of the main circuit-part 23, when the voltage on the input of circuit 21, i.e. the voltage across the primary winding 11 of the transformer, lies beneath the aforesaid voltage valve. When this voltage value is exceeded, the voltage on the base of the transistor 25 increases sufficiently for the lastmentioned transistor to become conductive and the transistor 29 of the main circuit-part to cease to be conductive. These circumstances are illustrated in FIG. 3, where the horizontal portions of the curves mark the voltage levels above which the control circuit-part 22 chokes the transistor 29 in the main circuit-part 23.

The arrangement of the circuit 21 effectively prevents re-magnetization of the transformer 10 when the thyristors 15 are not conductive, thereby to prevent the transformer from becoming saturated.

Figure 4:
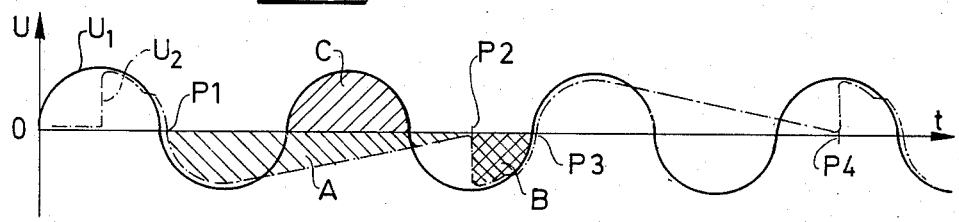
FIGS. 4 and 5 are respective diagrams illustrating the voltage on the primary side of a transformer, both in the absence of and in the presence of the circuit illustrated in FIG. 2 or the circuit illustrated in FIG. 6.

FIG. 4 illustrates possible voltage conditions on the primary side of the transformer 10 in the absence of circuit 21, when the thyristors 15 are ignited alternately only each third half period, and the ignition angle is such that voltage is only applied to the primary winding 11 of the transformer 10 during a minor part of the duration of these half periods. In FIG. 4, $U_1$ identifies the output voltage of the voltage source 13, while $U_2$ identifies the voltage across the primary winding 11. As can be seen, at point P1 the voltage passes through the 0-line in an undesirable manner, and falls back thereto at a latter point in time. A new half cycle is commenced at P2, and the voltage $U_2$ then, at point P3 again passes through the O-line in an undesirable manner, and lies above said line until the completion of the cycle at point P4. When the voltage-time-areas A and B on one side of the O-line reach the maximum value which can be taken up by the transformer, the transformer 10 will become saturated, resulting in current surges on the primary side. A transformer is normally dimensioned so that it can take up the voltage-time-area lying between the zero line and a half period, i.e. the area C.

Figure 5:
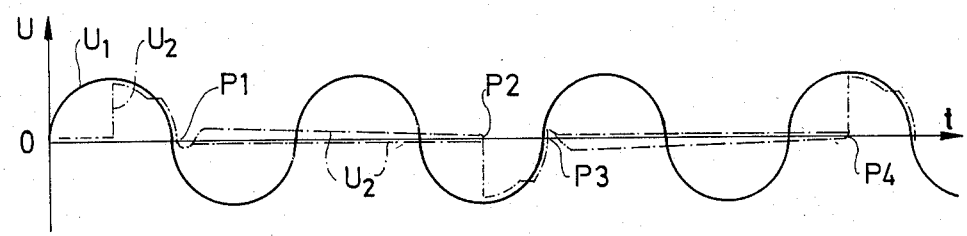

FIG. 5 illustrates the voltage conditions on the primary side of the transformer 10, when the arrangement incorporates the circuit 21. The references $U_1$, $U_2$, P1–P4 used in FIG. 5 have the same significance as those in FIG. 4. As illustrated by the dash line in FIG. 5, the circuit 21 is instrumental in substantially locking the voltage $U_1$ across the primary winding 11 of the transformer to the O-line at points P1 and P3.

Figure 6:
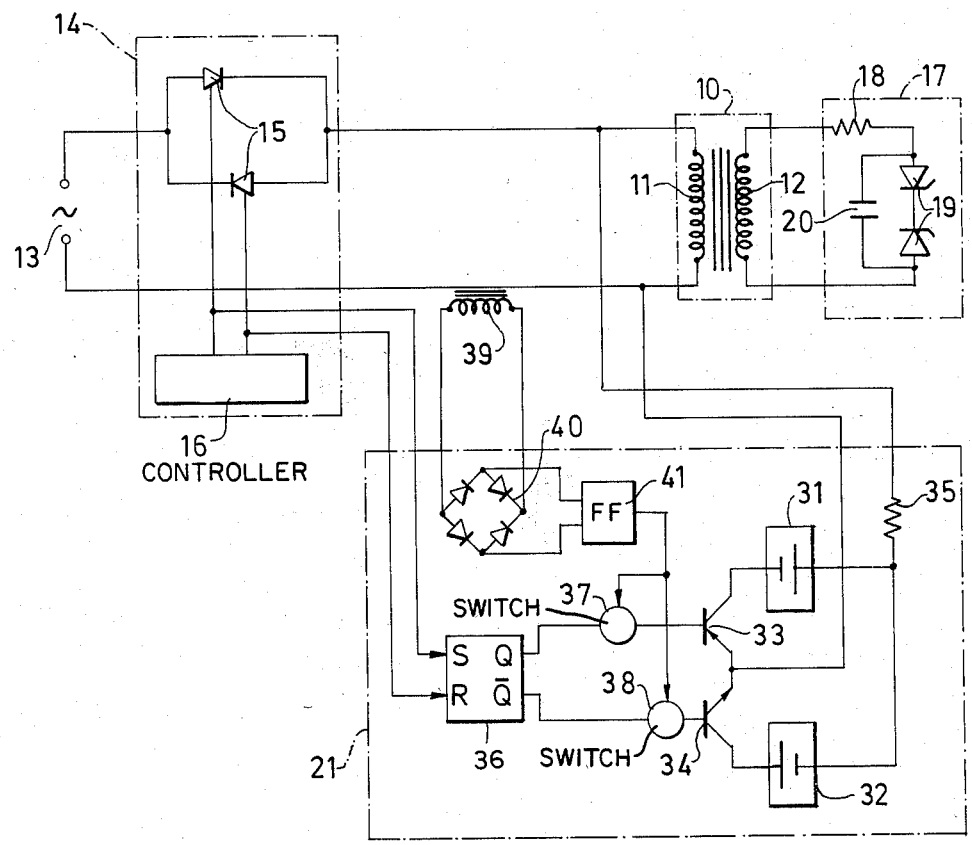
FIG. 6 is a circuit diagram similar to that shown in FIG. 1, but incorporating a circuit designed in accordance with a second embodiment.

FIG. 6 illustrates the arrangement of FIG. 1 provided with an alternative circuit 21 which during the time when the switch means 14 is open, not only maintains magnetization of the transformer 10 in a direction opposite to the direction of magnetization which results from the subsequent closing of the switch means, but also generates a current which magnetizes the transformer.

The magnetizing circuit illustrated in FIG. 6 includes two, suitably regulatable current sources 31, 32, each of which is connected with a respective transistor 33, 34. The two current sources are also connected in series with a current-limiting resistance 35, which is also suitably regulatable, and with the primary winding 11 of the transformer 10. The two current sources 31, 32 are opposed to one another, so as to generate a current through the winding 11 in one direction or the other, when the associated transistor 33 or 34 becomes conductive. Each of the bases of the transistor 33, 34 is connected to a respective output of an RS-flip-flop 36, via electronic switches 37, 38. The flip-flop 36 is triggered to produce voltage on either the Q-output or the $\bar{Q}$-output, by means of the signals applied to the gates of the thyristor 15, and the voltage from those two outputs can cause associated transistors 33, 34 to conduct, provided that the switches 37, 38 are closed. The switches 37, 38 are operated by means of an actuating circuit which includes a current transformer 39, which is arranged on the primary side of the transformer 10 in the manner shown and which is connected, via a rectifying bridge 40, to a level flip-flop 41, which goes high and holds the switches 37, 38 closed, provided that no current flows through the current transformer 39. Thus, when no current flows through the current transformer 39, both switches 37,38 are closed and the flip-flop holds that transistor 33 or 34 conductive whose associated current source 31 or 32 will magnetize the transformer 10 in a direction opposite to the direction of magnetization caused by the subsequent closing of the switch means 14. Thus, with the arrangement illustrated in FIG. 6 there is maintained a voltage, illustrated by a dash dotted line in FIG. 5, across the primary winding 11 during the periods P1–P2 and P3–P4, wherewith the magnetizing voltage lies above the O-line if with subsequent closing of the switch means 14 the voltage lies beneath the O-line, and vice versa.

FIG. 7 shows high/low impedance circuit 21 coupled in parallel to the secondary (designated S) of transformer 10.

The invention is not restricted to the above embodiments described with reference to the drawings, but can be realized in many ways within the concept of the invention as defined in the claims. For example, the circuit 21 can be connected across the secondary winding 12 of the transformer, or across both windings 11 and 12, and inductances can also be used on the primary and/or secondary side of the transformer, in combination with the circuit 21.

I claim:

1. An arrangement for a transformer having a primary winding which is connectable to an a.c. voltage source via a switch means which opens and closes at a controllable frequency in a manner such that said switch means is closed during at least parts of predetermined half-periods of the a.c. voltage separated by a predetermined even number of half-periods of said a.c. voltage, wherein connected in parallel with the primary or secondary winding of the transformer is a circuit which substantially maintains the magnetization of the transformer caused by the previous closing of the switch means.

2. An arrangement according to claim 1, wherein said circuit exhibits a high impedance to voltages above a given value and a low impedance to voltages below said value, said value being substantially lower than the output voltage of the a.c. voltage source.

3. An arrangement according to claim 2, wherein said voltage value lies within the range 2–30% of the output voltage of the a.c. voltage source.

4. An arrangement according to claim 2, wherein said voltage value lies within the range 3–15% of the output voltage of the a.c. voltage source.

5. An arrangement according to claim 1, wherein said circuit includes at least one d.c. voltage source which is connectable in series with the primary or secondary winding of the transformer for at least a part of the time during which the switch means is open to drive a current therethrough.

* * * * *